(12) United States Patent
Zaccone et al.

(10) Patent No.: US 6,859,590 B1
(45) Date of Patent: Feb. 22, 2005

(54) HYBRID ELECTRICAL-OPTICAL CABLE FOR OVERHEAD INSTALLATION

(75) Inventors: Ernesto Zaccone, Masio (IT); Sergio Belli, Livorno (IT); Giuseppe Casanova, Milan (IT); Paolo Marelli, Arosio (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 0 days.

(21) Appl. No.: 09/744,074

(22) PCT Filed: Jul. 16, 1999

(86) PCT No.: PCT/EP99/05023

§ 371 (c)(1),
(2), (4) Date: Apr. 27, 2001

(87) PCT Pub. No.: WO00/05730

PCT Pub. Date: Feb. 3, 2000

(30) Foreign Application Priority Data

Jul. 20, 1998 (IT) ..................... MI98A001658

(51) Int. Cl.$^7$ .............................. G02B 6/44; G02B 6/04
(52) U.S. Cl. ...................................... 385/101; 385/147
(58) Field of Search ....................... 385/100–115, 147

(56) References Cited

U.S. PATENT DOCUMENTS

| | | | |
|---|---|---|---|
| 4,699,461 A | 10/1987 | Taylor et al. | |
| 5,123,075 A | 6/1992 | Renton | |
| 5,555,338 A | 9/1996 | Haag et al. | |
| 5,687,271 A | 11/1997 | Rabinowitz | |

FOREIGN PATENT DOCUMENTS

| | | | |
|---|---|---|---|
| DE | 32 24 597 | 12/1983 | |
| DE | 3224597 | * 12/1983 | ................ 385/100 |
| EP | 0 081 327 | 6/1983 | |
| FR | 2 563 042 | 10/1985 | |
| FR | 2563043 | * 10/1985 | ................ 385/100 |
| GB | 2 035 599 | 6/1980 | |
| GB | 2035599 | * 6/1980 | ................ 385/100 |
| WO | 98/52197 | 11/1998 | |

OTHER PUBLICATIONS

M. Satoru, "Optical Fiber Composite Overhead Earth—Wire For Overhead Distribution Line," Patent Abstracts of Japan of JP 09 115352, May 2, 1997.
ENEL (Ente Nazionale Energia Elettrica), Unified Standard DC4389, 1$^{st}$ ed., Feb. 1994.
Ferraiolo et al., "Prime Valutazioni Sulle Esperienze Emerse Dalla Progettazione, Costruzione Ed Esercizio Di Linee In Cavo Aereo Isolato MT" Rendiconti 95$^a$ Riunione Annuale AEI, Associazione Elettrotecnica ed Elettronica Italiana, vol. 3, pp. 109–119, (1994).
Choix et Installation De Cables Autoporteurs HN 33–S–23, Moyenne Tension En Poly éthyléne Réticulé, p. 1.
ENEL (Ente Nazionale Energia Elettrica), "Visible Spiral 3–Pole Medium Voltage Cables with Aluminum Conductors Insulated with Ethylene–Propylene Rubber Under a Sheath of Polyethylene and Messenger Cable of Aluminum–Coated Steel ARG7H5EXY–12/20 kV," Unified Standard DC4389, 1$^{st}$ ed., Feb. 1994.

(List continued on next page.)

*Primary Examiner*—Akm Enayet Ullah
(74) *Attorney, Agent, or Firm*—Finnegan, Henderson, Farabow, Garrett, & Dunner, L.L.P.

(57) ABSTRACT

Hybrid electrical-optical cable for overhead installations for power distribution and for telecommunications, comprising three insulated phase conductors helically wound around a supporting rope. Inside the supporting rope there is at least one optical fibre element fitted in a tubular structure which resists transverse compression, a supporting structure resistant to longitudinal tension being present around the said tubular structure.

29 Claims, 6 Drawing Sheets

OTHER PUBLICATIONS

Ferraiolo et al., "Prime Valutazioni Sulle Esperienze Emerse Dalla Progettazione, Construzione Ed Esercizio Di Linee In Cavo Aereo Isolato MT" "Evaluation of Experiments Involving the Design, Construction and Operation of Aerial MV Lines of Insulated Cable," Rendiconti 95$^a$ Riunione Annuale AEI, Associazione Elettronica ed Elettronica Italiana, vol. 3, pp. 109–119, (1994).

"Selecting and Installing HN 33–S–23 Self–Supporting Cables," "Choix et Installation De Cables Autoporteurs HN 33–S–23, Moyenne Tension En Polyéthyléne Réticulé," FILERGIE, D'un Avenir L'Autre, Groupe Pirelli, p. 1.

"Selecting and Installing HN 33–S–23 Self–Supporting Cables, Medium Voltage, Crosslinked Polyetheylene" "Choix et Installation De Cables Autoporteurs HN 33–S–23, Moyenne Tension En Polyéthyléne Réticulé," FILERGIE, D'un Avenir L'Autre, Groupe Pirelli, pp. 1–34, (Nov. 1989).

* cited by examiner

HYBRID ELECTRICAL-OPTICAL CABLE FOR OVERHEAD INSTALLATION

The present invention relates to a hybrid electrical-optical cable suitable for installation along overhead lines for telecommunications and for electrical power distribution, particularly at low or medium voltage.

There is at present a recognized need to convert the electrical power transmission and distribution network into a combined network which also comprises an optical fibre system for telecommunications.

Various solutions have been proposed in this field for high-voltage (132–400 kV) overhead transmission lines wherein use is made of non-insulated conductors suspended between pylons on the top of which a guard wire is installed to protect the line from excess voltages caused by the action of lightning. These solutions require the use, as guard wires, of self-supporting cables which include one or more optical fibre elements for telecommunications. These cables consist of a plurality of non-insulated metal conductors, helically wound together in such a way as to form an inner space which extends longitudinally through the whole cable. Within this space the optical elements are housed, fitted in a metal tubular structure which has the function both of protecting the optical elements from external mechanical stresses and of draining the currents due to atmospheric discharges. Various embodiments of these cables are described, for example, in patents EP-81,327, U.S Pat. No. 4,699,461, U.S Pat. No. 5,123,075 and U.S Pat. No. 5,555,338.

There are also overhead lines for medium or low voltage power distribution (generally from 0.4 to 36 kV linked) in which triple-core cables, consisting of three phase conductors, are used, each of these conductors being insulated with a thermoplastic or cross-linked polyolefin layer, which, particularly in medium voltage cables, is in turn surrounded by a metal screen and by a protective sheath made from thermoplastic material. The three insulated conductors are helically wound around a metal supporting rope, which provides the mechanical tensile strength required for the suspended installation of the cable. The supporting rope can be coated by an electrically insulating layer when the rope performs the additional function of neutral conductor, particularly when low voltage cables are concerned. Insulated overhead cables of these types are described, for example, in Unified Standard DC4389, 1st ed., February 1994, established by ENEL (Ente Nazionale Energia Elettrica), Italy.

Overhead lines with insulated cables do not make use of guard wires, since the risk of lightning strike is lower than that encountered with high-voltage lines having non-insulated conductors, and is further decreased by the presence of lightning arresters both along the line and at its ends. Moreover, the conductors, being insulated from each other and from the earth, are not subject to direct-contact voltages.

Consequently, for the conversion of electrical lines for power distribution at medium or low voltages with insulated cables into a combined electrical-optical network, it is impossible in practice to use guard wires consisting of self-supporting cables including optical elements as described above. This would require in fact re-designing and substituting the whole line, owing to the addition of an element (the guard wire) which is unnecessary, with consequent unacceptable increase in the costs of installation.

French patent application FR-2,563,042 describes a cable for simultaneously transmitting medium voltage electric power and high volume telecommunications wherein three insulated phase conductors are arranged around a central element. The cable would be suitable both for underground installation and for overhead networks. The central element comprises a tube of insulating thermoplastic material containing an optical transmission module, said tube being surrounded by a layer of metal wires which would protect the optical fibers of the module against mechanical stresses. Externally to the metal wires a sheath is arranged, which is made of lead when the cable is to be installed underground. From page 3, line 27, to page 4, line 1, of that French application it is stated that, when the cable is intended for overhead installations, a sheath is generally provided around the thermoplastic tube to protect the optical fibers against water infiltration, while the metal wires are made of steel and the sheath surrounding said wires is constituted by a rigid plastic material such as polyvinyl chloride or branched polyethylene.

According to the Applicant's experience, the cable described in FR-2,563,042 is totally unsuitable for an overhead installation. In fact, in the Applicant's view, in an overhead installation the central element containing the optical transmission module must withstand both longitudinal stresses and transversal compression forces. While the steel wires included in the cable disclosed in FR-2,563,042 should be able to resist a longitudinal force, no elements are provided in that cable to effectively protect the optical element against transversal compression forces. The only suggestion given in FR-2,563,042 to make the cable self-sustaining is to replace the external lead sheath placed around the metal wires with a sheath made of a rigid plastic material. However, the Applicant believes that the external sheath is not effective at all, since, being placed externally with respect to the metal wires, cannot protect the optical element from the intense compression forces exerted by the wires when the cable is manufactured and installed. In fact, the metal wires, as well as the insulated conductors, when longitudinally stressed, tends to converge towards the rope center, thus strongly compressing the optical element placed inside.

Moreover, the cable as described in FR-2,563,042 practically cannot be installed on an overhead line, since the central element is placed in a position which is hardly accessible from the outside. Therefore, the central element cannot be used as supporting rope to install the cable overhead, since it cannot in fact be extracted from the winding of the three insulated conductors to be suspended to the mooring means of the overhead line.

The Applicant has now found that it is possible to produce a hybrid electrical-optical cable for overhead installations, comprising a three-phase electrical cable with insulated conductors helically wound around a supporting rope consisting of an outer structure which resists longitudinal tension, within which is fitted at least one optical fibre element enclosed in a tubular structure resistant to transverse compression. In this way it is possible to provide, in a single self-supporting structure, a combination of insulated conductor elements and optical fibre elements, ensuring high reliability in operation.

Therefore, in a first aspect the present invention relates to a hybrid electrical-optical cable for overhead installations, comprising three insulated phase conductors helically wound around a supporting rope, wherein said supporting rope comprises:
  at least one optical fibre element;
  a tubular structure containing said at least one optical element, said tubular structure being resistant to transverse compression;

a supporting structure resistant to longitudinal tension placed externally to said tubular structure.

According to a preferred aspect, the ratio between the diameter of the supporting rope and the diameter of each insulated conductor is predetermined so as to make the rope extractable from the helically wound insulated conductors. According to a particularly preferred embodiment, said ratio is greater than 0.3, more preferably is from 0.4 to 1.5.

According to a preferred embodiment, the insulated conductors are wound around the supporting rope with a predetermined pitch so as to make the cable self-sustaining. According to a particularly preferred embodiment, said pitch is from 10 to 50 times, more preferably from 20 to 40 times, the diameter of each insulated conductor.

The tubular structure ensures a high degree of protection of the optical element, preventing the action of transverse compressive forces on the optical fibres during the production, installation and operation of the cable, which would cause phenomena of "micro-bending", with consequent attenuation of the optical signal or even fracture of the fibres themselves. The transverse compression may be caused both by the insulated phase conductors, which, under the action of a strong tensile force, compress the supporting rope and consequently the optical element contained in it, and by the supporting structure which, when subjected to tension, tends to reduce its diameter and consequently the inner space which houses the optical element. The effects of radial compression are subsequently amplified by any geometrical irregularities of the supporting structure, which may cause localized compressive forces, which may be very strong, to act on the optical element.

The supporting structure forms the element which enables the cable to be suspended between the sustaining structures (poles, pylons and similar) of the overhead line, since it is capable of withstanding the intense mechanical forces, mainly longitudinal tensile forces, to which the cable is subjected during the installation phase and when it is in operation. In particular, the supporting structure is capable of withstanding the mechanical stresses arising from the weight of the cable itself, from the wind and from the mooring means used to anchor the cable to the sustaining structures of the overhead line.

According to a second aspect, the present invention relates to an overhead system for electrical power distribution and for telecommunications, comprising three insulated phase conductors wound around a supporting rope, the said cable being fixed between sustaining structures by mooring means, characterized in that the said supporting rope includes at least one optical fibre element.

According to a further aspect, the present invention relates to a method for suspending a hybrid electrical-optical cable to an overhead line, said cable comprising three insulated phase conductors helically wound around a supporting rope, wherein said method comprises:

pushing at least one of the three insulated conductors so as to make the supporting rope accessible from the outside;

hooking the supporting rope by a hooking means;

extracting the supporting rope by the hooking means from the wound insulated conductors for a predetermined length;

clamping the extracted lenght of the supporting rope by a mooring means;

releasing the supporting rope from the hooking means;

suspending the cable to sustaining structures of the overhead line by the mooring means.

The present invention will now be illustrated more clearly by the following detailed description, provided for further information without any limitative purposes for the claim scope, with reference to the attached drawings, wherein:

Figure 1:
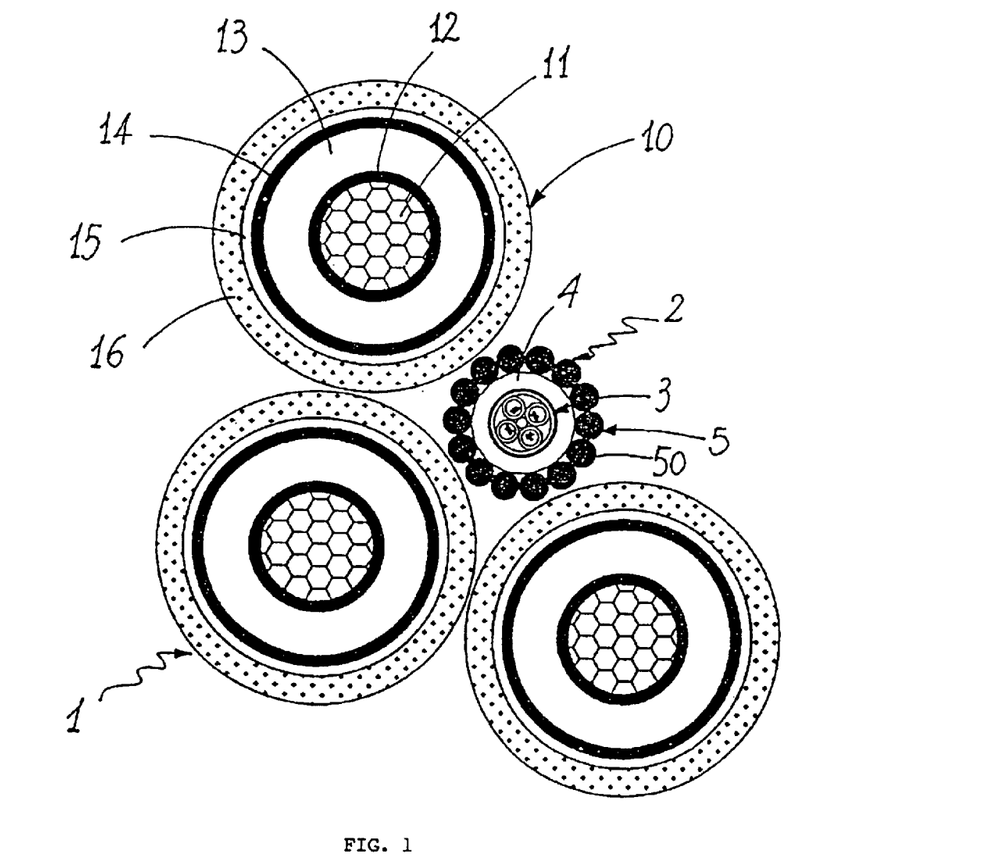
FIGS. 1 and 2 are schematic representations of transverse sections of two possible embodiments of the cable according to the present invention.

With reference to FIG. 1, the triple-core electrical cable (1), particularly suitable for medium voltage power distribution, comprises three single-core elements (10) helically wound around a supporting rope (2) which comprises an optical fibre element (3) (whose specific structure corresponds to that shown in FIG. 3, described below) fitted in a tubular structure (4) around which a supporting structure (5) is present.

Each single-core element (10) comprises, from the inside to the outside, a conductor (11), an inner semiconducting layer (12), an insulating layer (13), an outer semiconducting layer (14), a metal screen (15), and an outer sheath (16).

The conductor (11) generally consists of elementary metal wires, preferably made from aluminium or copper, stranded together according to conventional methods, or a single solid aluminium conductor.

The insulating layer (13) is produced by extrusion of a polymer compound, cross-linked or non-cross-linked, having as its base component a polymer selected, for example, from the following: polyethylene, particularly low-density polyethylene (LDPE), linear low-density polyethylene (LLDPE), medium-density polyethylene (MDPE), high-density polyethylene (HDPE), cross-linked polyethylene (XLPE); polypropylene (PP); thermoplastic propylene/ ethylene copolymers; ethylene-propylene rubbers (EPR) or ethylene-propylene-diene rubbers (EPDM); natural rubbers; butyl rubbers; ethylene/vinyl acetate copolymers (EVA); ethylene/methyl acrylate copolymers (EMA); ethylene/ethyl acrylate copolymers (EEA); ethylene/butyl acrylate copolymers (EBA); thermoplastic ethylene/alpha-olefin copolymers; or mixtures of these. Cross-linking, if any, may be carried out by known methods, particularly by means of peroxide initiators or by means of hydrolysable silane groups.

The semiconducting layers (12, 14) are made by extrusion of compositions based on polymers selected from those indicated above for the insulating layer (13), with the addition of carbon black in sufficient quantities to impart semiconductive properties.

The metal screen (15) generally consists of metal wires or tapes, longitudinally disposed or helically wound around the core of the cable.

An outer protective sheath (16), consisting of a thermoplastic material, generally polyethylene (PE) or polyvinyl chloride (PVC), is normally applied around the screen (15).

Figure 2:
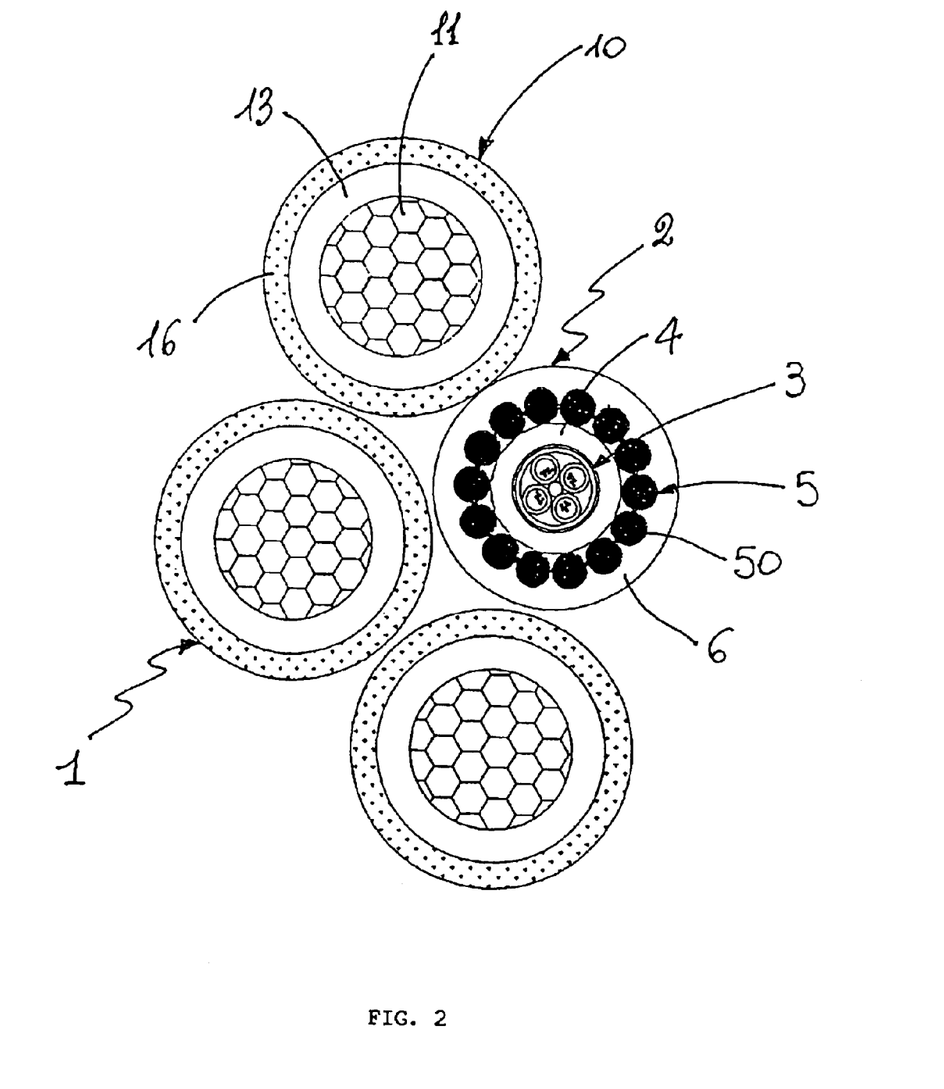

With reference to FIG. 2, the triple-core electrical cable (1), particularly suitable for low voltage power distribution, is structurally similar to that shown in FIG. 1, except that it has neither the semiconducting layers (12, 14) nor the metal screen (15).

To impart properties of impact resistance, a layer of expanded polymer material (not shown in FIGS. 1 and 2) may be applied around the sheath (16), as described in International Patent Application WO 98/52197. In particular, preference is given to polymer materials which have, before expansion, a flexural modulus at room temperature of more than 200 MPa and preferably of at least 400 MPa (measured according to the ASTM D790 standard), but in any case not exceeding 2,000 MPa, in order not to increase the rigidity of the cable excessively. The polymer material may be selected, in particular, from olefin polymers or copolymers, preferably based on polyethylene (PE) and/or polypropylene (PP) mixed with ethylene-propylene rubbers. Advantageously, PP modified with ethylene-propylene rubbers (EPR) may be used, with a PP/EPR ratio by weight of between 90/10 and 50/50, preferably between 85/15 and 60/40. The degree of expansion of the polymer is highly variable, according to the specific polymer used and the thickness of the coating which is to be produced. In general, the degree of expansion may vary from 20% to 3,000%, preferably from 30% to 500%. Further details of the characteristics of this expanded polymer layer are given in the aforesaid WO 98/52197, the text of which constitutes an integral part of the present description.

The tubular structure (4) is generally constituted by a material having a high mechanical modulus, preferably a metal or a polymeric material. Advantageously, metals or metal alloys having high corrosion resistance, for example aluminium or stainless steel, may be used, or high-modulus polymers ("technopolymers") such as polypropylene, modified polypropylene, polybutylene terephthalate (PBT), polyether imides, polyether sulphones, and the like.

The tubular structure (4) may alternatively consist of an expanded polymer material such as those described in the aforesaid WO 98/52197, in a similar way to that indicated above for the expanded layer which may be applied around the sheath (16). The use of an expanded polymer material makes it possible to significantly decrease the total weight of the cable and to effectively dissipate the energy derived from the transverse compressive forces such as those described above.

The supporting structure (5) is placed around the tubular structure (4), said supporting structure (5) generally consisting of an armour comprising one or more layers of metal wires (50), preferably made from steel, possibly coated with aluminium or zinc-plated in such a way as to increase its corrosion resistance, or, alternatively, from an aluminium alloy. The metal wires are helically stranded around the tubular structure (4) in such a way as to form a compact structure.

With particular reference to FIG. 2, concerning a low voltage cable, the supporting structure (5) may be coated by an electrically insulating layer (6). In this embodiment the supporting rope (2) performs the additional function of neutral conductor for the cable. The optical fibre element (3), whose structure may be selected from those commonly used for the cores of optical cables, is housed inside the tubular structure (4). The external diameter of the optical fibre element (3) is slightly smaller than the internal diameter of the tubular structure (4), in such a way as to permit its easy insertion into the tubular structure (4) while at the same time preventing substantial lateral movement of the optical element (3) inside the structure (4), which might damage the optical fibres.

Figure 3:
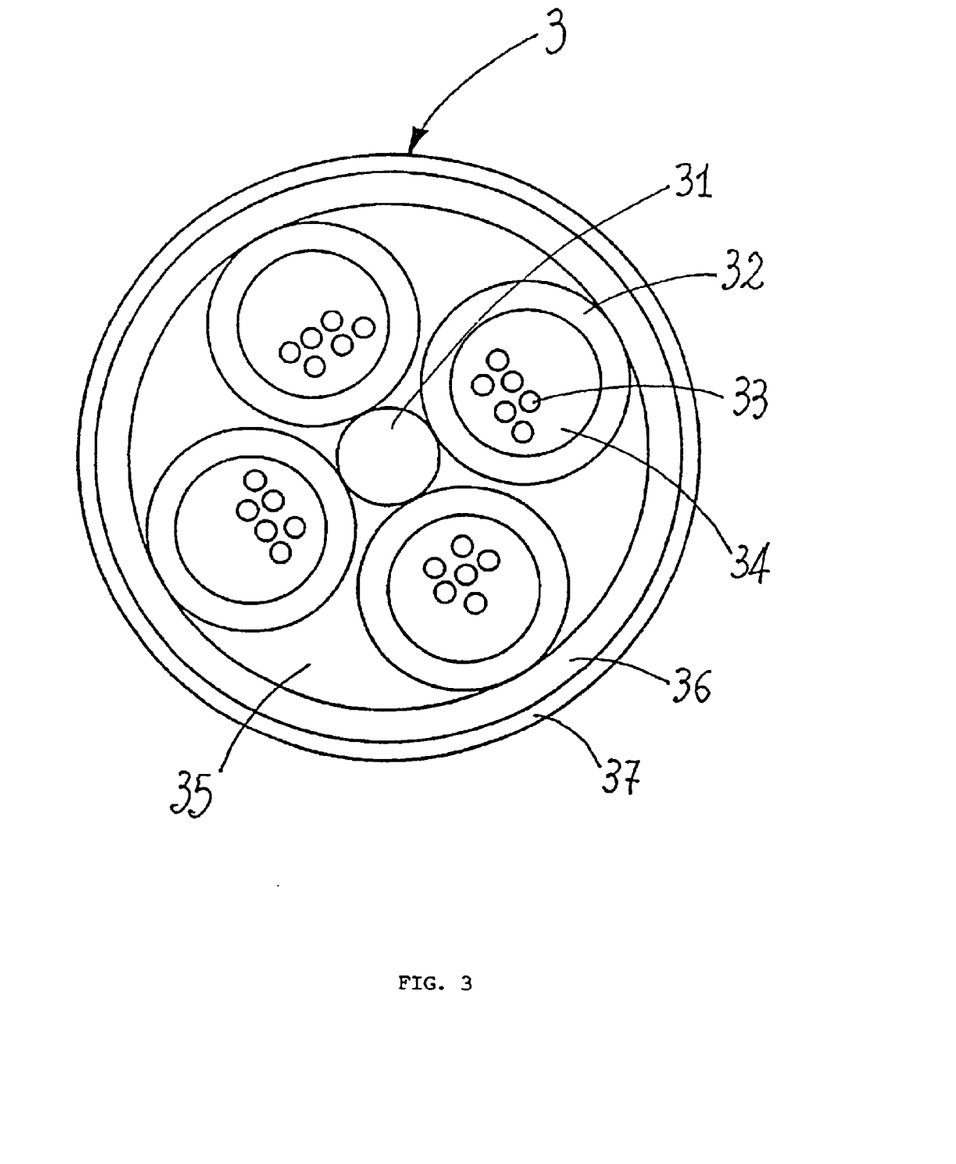
FIGS. 3–5 show schematically in transverse section three possible embodiments of the optical fibre element to be used in the cable according to the present invention.

A first embodiment of the optical fibre element (3) is shown in FIG. 3. This has, in the radially innermost position, a reinforcing element (31), typically made from glass-fibre reinforced plastic. Around the reinforcing element (31) there are disposed one or more tubular elements (32), usually made from PE, PBT or PP, between which are housed the optical fibres (33), immersed in a buffering filler (34) whose function is to block any water which may enter the optical element. The tubular elements (32) are also usually embedded in a buffering filler (35). The buffering filler which is normally used is a composition based on an oil of the silicone, mineral (naphthenic or paraffinic) or synthetic type, to which is added a viscosity-increasing agent, for example an elastomeric polymer with a low glass transition temperature (for example polyisobutene), and, if necessary, a thickening/thixotropic agent (for example pyrogenic silica), in addition to an antioxidant. The buffering filler, if necessary, may also act as a hydrogen absorber; in this case, a hydrogen-absorbing additive, such as carbon palladiate, is dispersed therein.

Around the tubular elements (33) there is usually present a first containing layer (36) consisting, for example, of a winding of synthetic fibre tapes, for example polyester, having the function of binding the optical core, and a second containing layer (37), consisting, for example, of wound tapes of aramid material (for example Kevlar®), having mechanical and thermal insulation functions.

Figure 4:
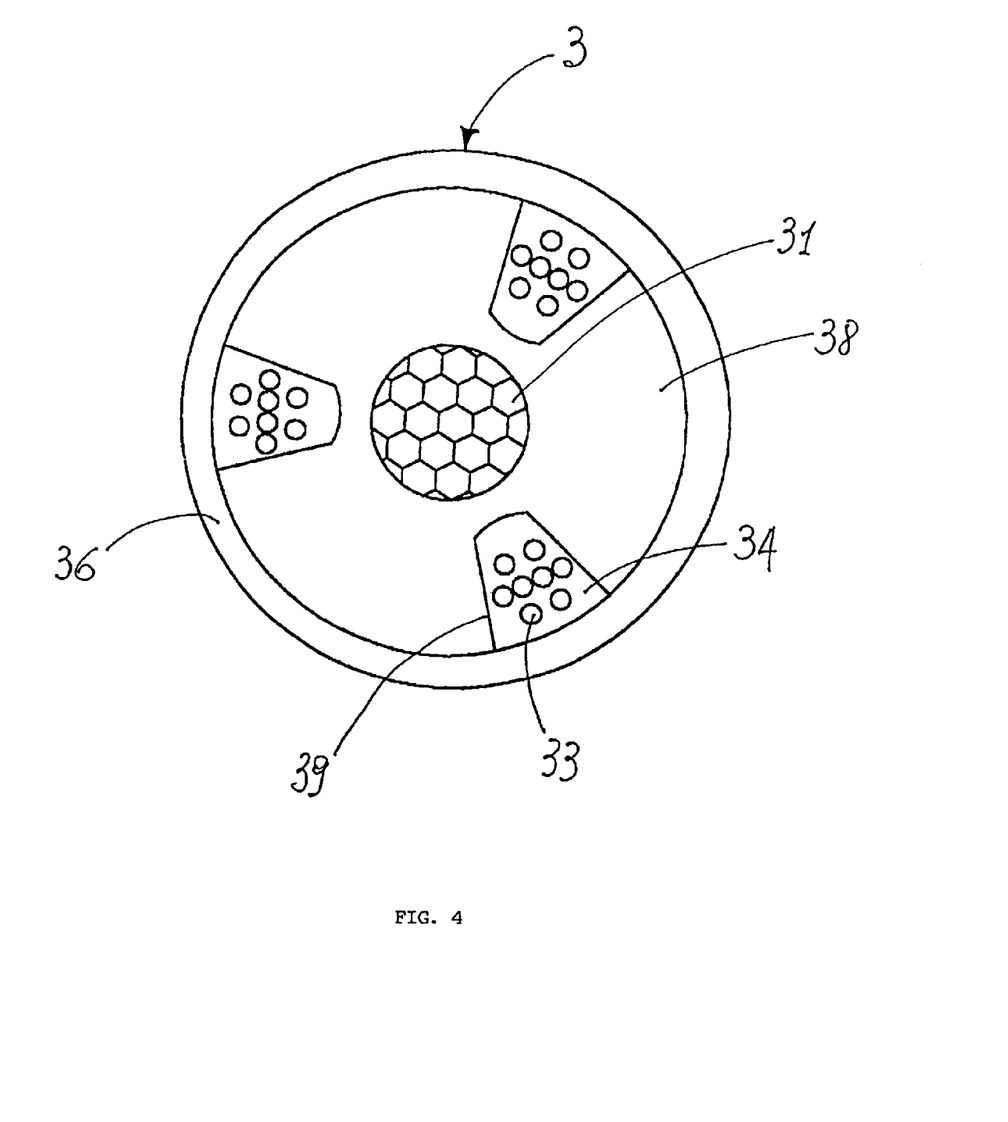

FIG. 4 shows another example of an optical fibre element (3) which may be used in the hybrid cable according to the present invention. It has, in the radially innermost position, a reinforcing element (31) on which is extruded a grooved core (38) wherein are formed external grooves (39) which extend either helically or with an s-z path along the whole outer surface of the said core. The grooves (39) are filled with a buffering material (34) as described above and house the optical fibres (33). The grooved core (38) is then surrounded by a containing layer (36) of the type described above for FIG. 2.

Figure 5:
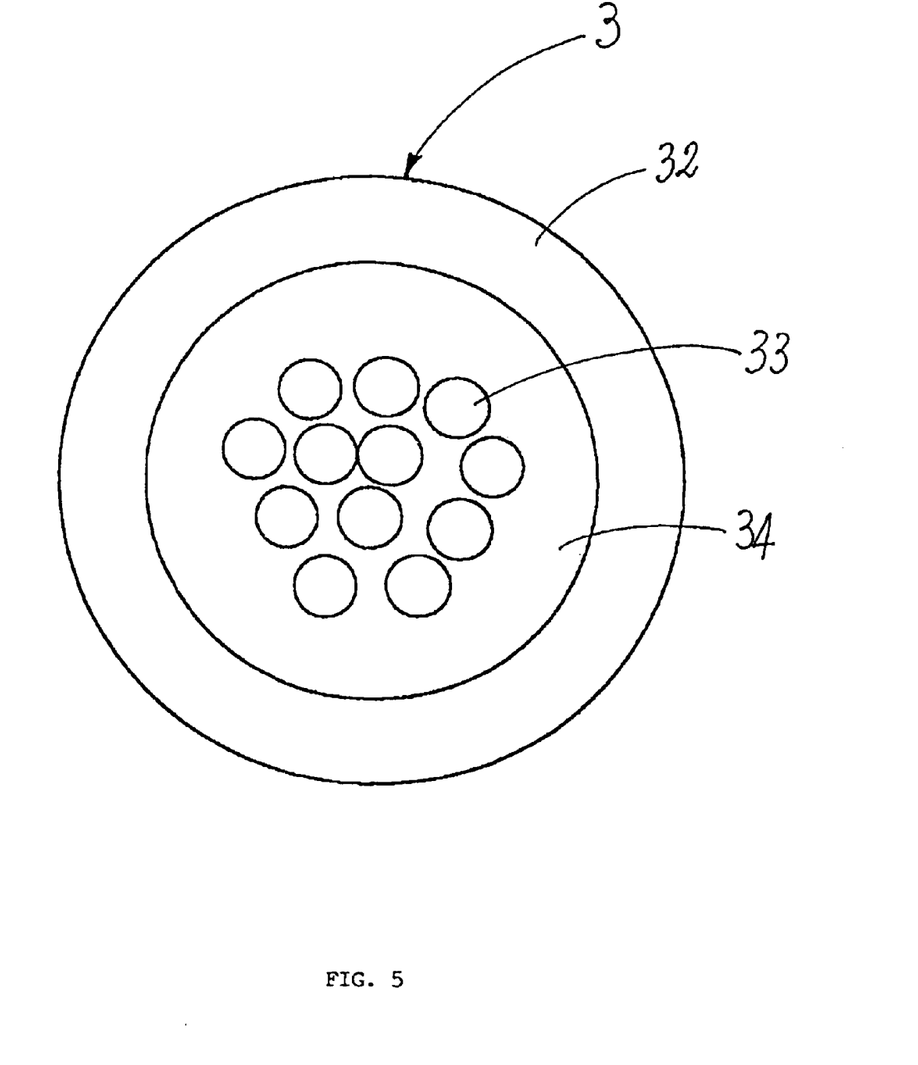

Finally, FIG. 5 shows a sectional view of another embodiment of the optical fibre element (3). This element comprises a tubular element (32) containing the optical fibres (33), preferably disposed loosely in the buffering material (34).

Figure 6:
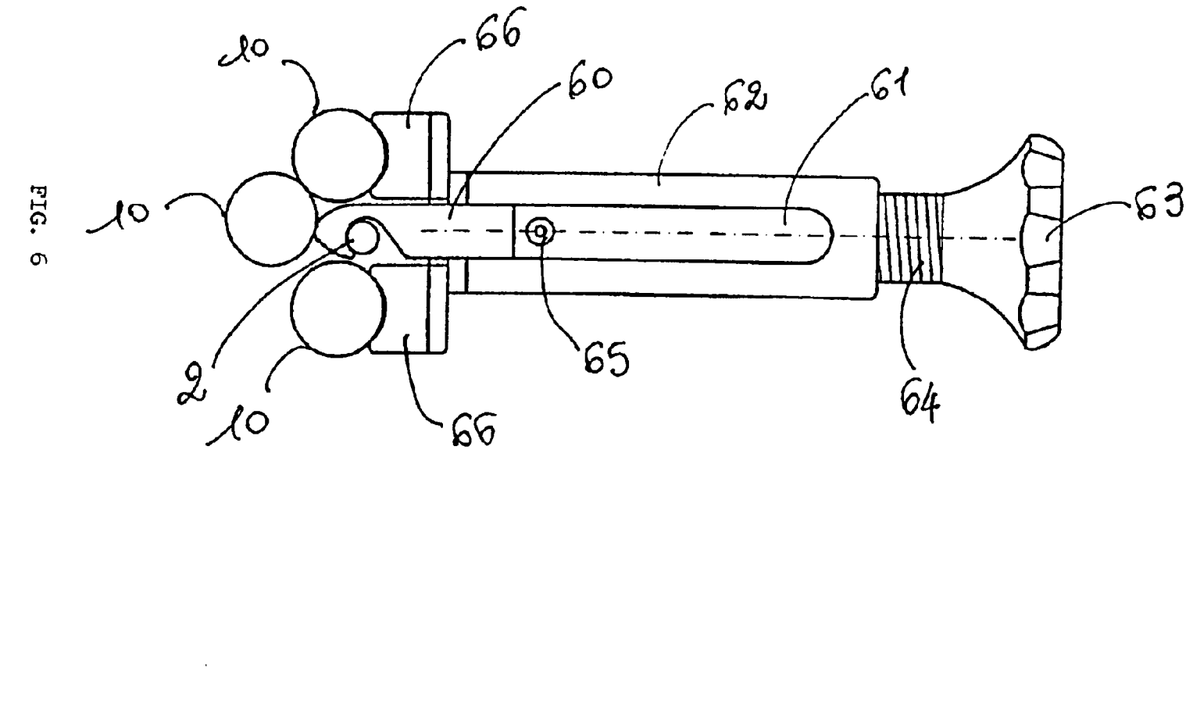
FIG. 6 schematically shows a possible way to extract the supporting rope from the helically wound insulated conductors to suspend the cable to an overhead line.

With reference to FIG. 6, the hybrid cable according to the present invention may be suspended at predetermined points along the cable extension to an overhead line according to the following method.

Firstly, at least one of the three insulated conductors is pushed so as to partially open the conductor winding and make the supporting rope easily accessible from the outside. This operation can be carried out, e.g., by means of one or more wedges inserted between the insulated conductors.

Then, as shown in FIG. 6, a hook (60) is inserted between the insulated conductors (10) to clasp the supporting rope (2). To make the extraction easier, the hook (60) can be mechanically linked to an extremity of a cylindrical element (61), longitudinally movable inside a casing (62). The longitudinal movement can be obtained, for instance, by rotating a knob (63) fixed at the other extremity of the cylindrical element (61) opposite to the hook (60). The external surface of the cylindrical element (61) is therefore provided with a thread (64) to engage it to the casing (62) whose internal surface is counter-threaded. To link the hook (60) to the cylindrical element (61) while leaving them independently rotatable, a pin (65) is provided in the cylindrical element (61). The casing (62) may be provided at one extremity with supporting blocks (66) to be leant against the insulated conductors (10) in order to assist insertion of the hook (60) and extraction of the rope (2).

The hybrid cable according to the present invention can be produced by means of a laying machine conventionally used in the cable industry. To avoid any damage to the optical element, during production it is important to apply to the supporting rope a drawing sufficient to constantly keep the rope in a central position with respect to the insulated conductors which are wound around it. Consequently, the supporting rope is prevented from being exceedingly and non-uniformly compressed by the insulated conductors.

A hybrid cable according to the present invention, whose structure is shown in FIG. 1, was constructed. The electrical cable consisted of three single-core elements (nominal diameter: 24 mm), each formed (from the inside to the outside) by: an aluminium conductor with a cross-section of 35 mm$^2$; an inner semiconducting layer (thickness 0.5 mm); a cross-linked EPR insulating layer (thickness: 5.5 mm); an outer semiconducting layer (thickness 0.5 mm); an aluminium tape screen, disposed longitudinally (thickness 0.15 mm); a polyethylene sheath (thickness 1.8 mm). The total weight of the electrical cable was of about 2.28 kg/m.

The three single-core elements were helically wound (pitch=approximately 850 mm) around a supporting rope containing an optical core as that shown in FIG. 2. The supporting rope, having an overall diameter of 12.48 mm, consisted of the optical core (external diameter: 5.5 mm) fitted into an aluminium tube having an external diameter of 8.0 mm and a nominal thickness of 1.25 mm, around which were wound 14 aluminium-coated steel wires (Alumoweld), each having a nominal diameter of 2.24 mm. The total weight of the supporting rope was approximately 0.48 kg/m.

The supporting rope was subjected to mechanical tests, which revealed a value of stress at break of 75.4 kN and a value of equivalent elasticity modulus (for an elongation of 0.3%) of 11000 kN/mm$^2$. No attenuation of the optical signal (measured by an Optical Time Domain Reflectometer (OTDR)) was observed up to a load of 38 kN. Moreover, compression tests were carried out on the supporting rope, by winding it around a cylinder having a diameter of 800 mm with a traction force of about 5,320 kg, thus determining a radial compression of about 13,300 kg/m. After the test the rope and the aluminium tube did not show any permanent deformations, and no OTDR attenuation of the optical signal was observed.

The measurements so obtained demonstrate that the supporting rope including the optical element is capable of withstanding high tensile forces without causing attenuation phenomena for the optical fibres. For example, the hybrid cable described above may be installed in overhead lines with lengths of up to 150 m between pylons, corresponding to tensile stresses of not more than 10 kN, with an ample safety margin for the integrity of the optical element.

What is claimed is:

1. Hybrid electrical-optical cable for overhead installations, comprising three insulated phase conductors helically wound around a supporting rope, wherein said supporting rope comprises:
   at least one optical fibre element comprising at least one tubular element containing at least one optical fibre;
   a tubular structure containing said at least one optical element, said tubular structure being made from a material having a high mechanical modulus to resist transverse compression;
   a supporting structure resistant to longitudinal tension placed externally to said tubular structure.

2. Cable according to claim 1, wherein the material of said tubular structure is selected from (a) metals, (b) metal alloys, and (c) high-modulus polymers.

3. Cable according to claim 2, wherein said tubular structure is made from aluminum or stainless steel.

4. Cable according to claim 2, wherein said high-modulus polymers comprise polypropylene, modified polypropylene, polybutylene terephthalate, polyether imides or polyether sulphones.

5. Cable according to claim 1, wherein said tubular structure is made from an expanded polymer.

6. Cable according to claim 5, wherein said expanded polymer is selected from (a) olefin polymers and (b) olefin copolymers.

7. Cable according to claim 6, wherein said expanded polymer comprises polypropylene.

8. Cable according to claim 1, wherein the ratio between the diameter of said supporting rope and the diameter of each insulated conductor is predetermined so as to make said rope extractable from said helically wound insulated conductors.

9. Cable according to claim 8, wherein said ratio is greater than 0.3.

10. Cable according to claim 9, wherein said ratio is from 0.4 to 1.5.

11. Cable according to claim 1, wherein the insulated conductors are wound around said supporting rope with a predetermined pitch so as to make the cable self-sustaining.

12. Cable according to claim 11, wherein said pitch is from about 10 to 50 times the diameter of each insulated conductor.

13. Cable according to claim 1, wherein the supporting structure comprises an armour comprising one or more layers of metal wires helically stranded around said tubular structure.

14. Cable according to claim 13, wherein said metal wires are made from steel.

15. Cable according to claim 14, wherein said metal wires are made from aluminum-coated or zinc-plated steel.

16. Cable according to claim 13, wherein said metal wires are made from an aluminum alloy.

17. Cable according to claim 1, wherein said supporting structure is coated by an electrically insulating layer.

18. Cable according to claim 1, wherein said optical fibre element comprises a central reinforcing element around which one or more tubular elements, containing one or more optical fibres immersed in a buffering filler, are disposed.

19. Cable according to claim 1, wherein said at least one optical fibre element further comprises a central reinforcing element around which is disposed a grooved core in which are formed externally one or more grooves which extend longitudinally along the outer surface of said core, said grooves being filled with a buffering filler in which one or more of said optical fibres are housed.

20. Cable according to claim 1, wherein said at least one optical fibre is immersed in a buffering filler.

21. Optical fibre element comprising at least one optical fibre coated by at least a containing layer, said optical fibre element being fitted in a tubular structure made from an expanded polymeric material.

22. Optical fibre element according to claim 21, wherein said polymeric material is selected from (a) olefin polymers and (b) olefin copolymers.

23. Optical fibre element according to claim 22, wherein said polymeric material comprises polypropylene.

24. Optical fibre element according to claim 21, wherein said polymeric material has a degree of expansion from 20% to 3000%.

25. Optical fibre element according to claim 24, wherein said polymeric material has a degree of expansion from 30% to 500%.

26. Optical fibre element according to claim 21, wherein before expansion said polymeric material has a flexural modulus at room temperature between 200 and 2000 MPa.

27. Optical fibre element according to claim 26, wherein said flexural modulus is between 400 and 2000 MPa.

28. Overhead system for electrical power distribution and for telecommunications, comprising a cable comprising three insulated phase conductors wound around a supporting rope, said cable being fixed between sustaining structures by mooring means operating on said supporting rope, characterized in that said supporting rope comprises at least one optical fibre element fitted in a tubular structure resisting to transverse compression.

29. Method for suspending a hybrid electrical-optical cable to an overhead line, said cable comprising:
- three insulated phase conductors helically wound around a supporting rope,
- a tubular structure made of a high mechanical modulus material suitable for containing at least one optical element, said at least one optical element comprising at least one tubular element containing at least one optical fibre, and
- a supporting structure placed externally to said tubular structure, wherein said method comprises:
- pushing at least one of the three insulated conductors so as to make the supporting rope accessible from the outside;
- hooking the supporting rope by a hooking means;
- extracting the supporting rope by the hooking means from the wound insulated conductors for a predetermined length;
- clamping the extracted length of the supporting rope by a mooring means;
- releasing the supporting rope from the hooking means; and
- suspending the cable to sustaining structures of the overhead line by the mooring means.

* * * * *